US010204228B2

(12) United States Patent
Falk (10) Patent No.: US 10,204,228 B2
(45) Date of Patent: Feb. 12, 2019

(54) DEVICE AND METHOD FOR SAFELY OPERATING THE DEVICE

(71) Applicant: Rainer Falk, Poing (DE)

(72) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 184 days.

(21) Appl. No.: 15/019,765

(22) Filed: Feb. 9, 2016

(65) Prior Publication Data

US 2016/0232361 A1 Aug. 11, 2016

(30) Foreign Application Priority Data

Feb. 9, 2015 (DE) .................. 10 2015 202 215

(51) Int. Cl.
*H04L 9/32* (2006.01)
*G06F 21/60* (2013.01)
(Continued)

(52) U.S. Cl.
CPC ........... *G06F 21/602* (2013.01); *G05B 15/02* (2013.01); *G05B 19/048* (2013.01); *G06F 21/34* (2013.01);
(Continued)

(58) Field of Classification Search
CPC .......... G09C 1/04; H04L 9/032; H04L 9/3226
(Continued)

(56) References Cited

U.S. PATENT DOCUMENTS 6,275,933 B1 * 8/2001 Fine .................. G06F 21/34
713/2
7,412,053 B1 * 8/2008 Lyle .................. H04L 9/0844
324/750.3

(Continued)

FOREIGN PATENT DOCUMENTS

DE 202007018769 U1 4/2009
DE 102011002703 A1 7/2012
(Continued)

OTHER PUBLICATIONS

German Office Action for German Application No. 10 2015 202 215.3 dated Sep. 15, 2015, with English Translation.

*Primary Examiner* — Lynn D Feild
*Assistant Examiner* — Viral S Lakhia
(74) *Attorney, Agent, or Firm* — Lempia Summerfield Katz LLC (57) ABSTRACT

A device includes a controller configured to carry out a control operation using a cryptographically determined parameter, and a safety apparatus for making available the cryptographically determined parameter. The device also includes a first physical interface configured to transmit the cryptographically determined parameter from the safety apparatus to the control apparatus, an enabling apparatus for making available enabling information for enabling the safety apparatus, and a second physical interface configured to transmit the enabling information from the enabling apparatus to the safety apparatus. The safety apparatus is configured to transmit the cryptographically determined parameter to the control apparatus via the first physical interface as a function of reception of the enabling information via the second physical interface.

19 Claims, 3 Drawing Sheets

(51) Int. Cl.
  *G05B 19/048* (2006.01)
  *G06F 21/34* (2013.01)
  *G06F 21/86* (2013.01)
  *G05B 15/02* (2006.01)

(52) U.S. Cl.
  CPC ............ *G06F 21/86* (2013.01); *H04L 9/3226* (2013.01); *H04L 9/3234* (2013.01)

(58) Field of Classification Search
  USPC ........ 713/190–192; 726/2–5; 711/163; 701/1
  See application file for complete search history.

(56) References Cited

U.S. PATENT DOCUMENTS

| | | | | |
|---|---|---|---|---|
| 7,805,765 B2* | 9/2010 | Challener | ............. | G06F 21/565 726/23 |
| 7,991,932 B1* | 8/2011 | Choksey | ............... | G06F 21/575 710/104 |
| 8,266,444 B2* | 9/2012 | Desmicht | ................ | G06F 21/79 380/239 |
| 9,026,806 B2 | 5/2015 | Falk et al. | | |
| 9,183,554 B1* | 11/2015 | Courtright | ............. | G06F 21/36 |
| 9,230,112 B1* | 1/2016 | Peterson | ............... | G06F 21/575 |
| 9,642,005 B2* | 5/2017 | Fosmark | ............ | G06Q 20/3223 |
| 2004/0005051 A1* | 1/2004 | Wheeler | ............... | H04L 9/3231 380/28 |
| 2006/0059373 A1* | 3/2006 | Fayad | ..................... | G06F 21/72 713/192 |
| 2009/0132829 A1* | 5/2009 | Ohhashi | ................. | G06F 21/57 713/187 |
| 2010/0180130 A1* | 7/2010 | Stahl | ....................... | G06F 21/10 713/193 |
| 2011/0320064 A1* | 12/2011 | Plankenhorn | ........ | G01D 3/0365 701/1 |
| 2012/0042357 A1* | 2/2012 | Mraz | ................... | H04L 12/5601 726/2 |
| 2012/0084544 A1* | 4/2012 | Farina | ................... | G06F 21/575 713/2 |
| 2013/0006866 A1* | 1/2013 | Pendakur | ........... | G06Q 30/0241 705/50 |
| 2013/0077782 A1* | 3/2013 | Buer | ....................... | G06F 21/72 380/44 |
| 2013/0179669 A1* | 7/2013 | Song | ...................... | G06F 21/575 713/2 |
| 2013/0305062 A1 | 11/2013 | Falk et al. | | |
| 2013/0311791 A1 | 11/2013 | Falk et al. | | |
| 2014/0137180 A1* | 5/2014 | Lukacs | ................... | G06F 21/53 726/1 |
| 2015/0012737 A1* | 1/2015 | Newell | ................. | G06F 21/575 713/2 |
| 2015/0095999 A1* | 4/2015 | Toth | ........................ | H04L 63/08 726/6 |
| 2016/0057125 A1* | 2/2016 | Li | ........................... | G06F 21/31 713/168 |
| 2016/0179704 A1* | 6/2016 | Berke | ................. | G06F 12/1441 711/163 |

FOREIGN PATENT DOCUMENTS

| | | |
|---|---|---|
| DE | 102011002706 B4 | 12/2013 |
| DE | 102013001412 A1 | 7/2014 |

* cited by examiner

DEVICE AND METHOD FOR SAFELY OPERATING THE DEVICE

This application claims the benefit of DE 10 2015 202 215.3, filed on Feb. 9, 2015, which is hereby incorporated by reference in its entirety.

BACKGROUND

The present embodiments relate to a device and to a method for safely operating the device.

Devices (e.g., computer platforms) that are integrated into a technical context may have a safety apparatus. The safety apparatus may be embodied as a single-chip safety microcontroller and acts as a trust anchor (e.g., as a superordinate entity) that is trusted without this trust having to be derived elsewhere. Safety apparatuses that function similarly to a chip card are generally known.

Such a safety apparatus provides the device with basic functions for implementing cryptographic methods. The device may be operated safely with the basic functions. This includes, for example, safe behavior, enabling, deriving, and outputting of cryptographic parameters (e.g., of cryptographic keys or cryptographic checksums; digital signatures or message authentication codes or of response values of a challenge response authentication protocol).

These basic functions are available after the safety apparatus has been enabled by enabling information. The enabling may be carried out by a control apparatus (Central Processing Unit, CPU) via a common physical interface. This physical interface is, however, not necessarily protected against tampering. The enabling information may therefore be read out in plain text on the CPU.

DE 10 2011 002 706 B4 discloses preventing the enabling of the safety apparatus by the control apparatus when attempted tampering is detected.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a safer device compared to the prior art is provided.

A device includes a controller for carrying out a control operation using a cryptographically determined parameter, and a safety apparatus for making available the cryptographically determined parameter. The device also includes a first physical interface for transmitting the cryptographically determined parameter from the safety apparatus to the control apparatus, an enabling apparatus for making available enabling information for enabling the safety apparatus, and a second physical interface for transmitting the enabling information from the enabling apparatus to the safety apparatus. The safety apparatus is configured to transmit the cryptographically determined parameter to the controller via the first physical interface as a function of reception of the enabling information via the second physical interface.

This prevents the controller being involved in the enabling of the safety apparatus.

Accordingly, the enabling information is also not present in the controller or capable of being read out therefrom. This applies, for example, even when control software of the controller is tampered with. This increases the safety of the device.

In addition, the controller may use merely the cryptographically determined parameters that are available to the controller after the enabling of the safety apparatus. However, for example, it is not possible for the control apparatus to have an effect on which of the cryptographically determined parameters are enabled for the apparatus. As a result, for example, it is possible to prevent cryptographically determined parameters that have been tampered with from being stored in the safety apparatus and improper control of the device on the basis thereof.

The enabling information is, for example, a PIN code, a password, a shared secret, a session key, a master key, or an attestation.

The enabling of the safety apparatus may require a bidirectional exchange of information between the enabling apparatus and the safety apparatus (e.g., in the case of a challenge-response method).

The enabling of the safety apparatus may be limited to a specific time window.

The cryptographically determined parameter may be, for example, a key (e.g., a session key or derived key) or a fingerprint of a system configuration (e.g., in the form of a hash value).

The safety apparatus may be configured to derive the cryptographically determined parameter based on the enabling information.

The safety apparatus may be integrated in the control apparatus, in a multi-chip module, or in a chip set of the device. The safety apparatus may have passive protection against tampering (e.g., a passivation layer, an anti-drilling foil, opening sensors, and/or light-sensitive sensors).

A physical interface is, for example, a line-bound or non-line-bound hardware interface.

The first physical interface has, for example, one of the serial protocols: USB, I2C, TWI, ISO/IEC7816, ISO/IEC14443A, RS232 or SPI.

In addition, the first and/or second physical interfaces may have channel encoding for protecting against transmission errors.

According to a further embodiment, the safety apparatus is configured to transmit the cryptographically determined parameter to the control apparatus via the first physical interface as a function of reception and as a function of checking of the enabling information via the second physical interface.

Checking of the enabling information provides, for example, that transmission of the cryptographically determined parameter may be triggered only by correct enabling information that is expected for the enabling of the safety apparatus.

The checking may include, for example, format checking of the transmitted enabling information, comparison of the contents (e.g., in a binary fashion) of the transmitted enabling information with expected enabling information, or comparison of a calculation result on which the transmitted enabling information is based with an expected calculation result.

According to a further embodiment, the first physical interface is embodied as a unidirectional interface coupled between the safety apparatus and the control apparatus.

A unidirectional implementation of the physical interface between the safety apparatus and the control apparatus makes it possible, for example, to prevent a direct effect of the control apparatus on the safety apparatus.

In addition, the design of this first physical interface is simplified.

According to one embodiment, the safety apparatus is configured to transmit the cryptographically determined parameter to the control apparatus via the first physical interface as a function of reception of the enabling information via the second physical interface and reception of further enabling information via the first physical interface.

As a result, the control apparatus may, for example, have an effect on when a cryptographically determined parameter is available to the control apparatus without, however, affecting the type or the information content of the cryptographic parameter that is to be specifically enabled.

According to a further embodiment, the safety apparatus is configured to transmit the cryptographically determined parameter to the control apparatus via the first physical interface as a function of reception and checking of the enabling information via the second physical interface and reception and checking of further enabling information via the first physical interface.

This embodiment combines the advantages of the additional checking of the enabling information and the additional possibility of influencing the control apparatus during the enabling of the safety apparatus of the two embodiments described above.

According to a further embodiment, the safety apparatus has a parameter memory for the cryptographically determined parameter.

As a result, it is possible to keep available a cryptographically determined parameter on the basis of which the control of the device may be carried out.

The parameter memory may be a binary solid state memory that may be addressed, for example, linearly, logically or by register identifiers.

According to a further embodiment, the parameter memory may be written to only via permanently assigned physical interfaces of the first and/or second physical interfaces of the safety apparatus.

Against the background of a plurality of physical interfaces, in this embodiment, the storage of the cryptographically determined parameter in the safety apparatus may be limited with respect to the interface via which this may take place. This increases the protection against tampering of the cryptographically determined parameter that is stored in the safety apparatus.

According to a further embodiment, the parameter memory is also configured to store an identifier of a physical interface, used for writing to the parameter memory, of the first and/or second physical interfaces of the safety apparatus in the cryptographically determined parameter.

Against the background of a plurality of physical interfaces, this makes it possible to determine the source from which the cryptographically determined parameter that is stored in the parameter memory originates. This permits, for example, forensic investigations when tampering with the stored cryptographically determined parameter is detected.

According to a further embodiment, the enabling apparatus is configured to make available the enabling information as a function of detection of a converging multiple program execution in the device.

As a result, the enabling of the cryptographically determined parameter may be prevented or revoked, for example, when the control software that is executed on the control apparatus is tampered with.

For this purpose, the execution of the program of the control apparatus is compared with the execution of at least one further structurally identical CPU that is executing separately made available control software that has not been tampered with.

According to a further embodiment, the enabling apparatus is configured to make available the enabling information as a function of detection of a stable clock supply of the device.

As a result, the enabling of the cryptographically determined parameter may be prevented or revoked when the clock supply of the device is tampered with in order to cause the control apparatus to execute control software that has been tampered with.

According to a further embodiment, the enabling apparatus is configured to make available the enabling information as a function of detection of a stable electrical power supply of the device.

This makes it possible, for example, to prevent or revoke the enabling of the cryptographically determined parameter when the electrical power supply of the device is tampered with, in order to cause the control apparatus to execute control software that has been tampered with.

According to a further embodiment, the enabling apparatus is configured to make available the enabling information as a function of detection of opening of the device (e.g., of a housing of the device).

In this embodiment, the enabling of the cryptographically determined parameter may be prevented or revoked, for example, when a housing of the device is opened in order, for example, to take out or replace individual apparatuses of the device or in order to examine the device with respect to an internal method of functioning.

The opening of the device may be, for example, unauthorized opening.

According to a further embodiment, the second physical interface is embodied as a unidirectional interface that is coupled between the enabling apparatus and the safety apparatus.

A unidirectional implementation of the physical interface between the enabling apparatus and the safety apparatus also simplifies the design of this second physical interface.

As an alternative to this, a device that brings about freedom from reaction may be provided between the enabling apparatus and the safety apparatus. This device may be, for example, a solid state memory in which simultaneous reading access operations or writing access operations are possible from two sides (e.g., dual-port RAM). In this context, the solid state memory may be operating in such a way that a first side permits only writing access operations, and a second side permits only reading access operations.

According to a further embodiment, the device also has a plurality of enabling apparatuses for making available a plurality of enabling information items for enabling the safety apparatus. In this case, the device also includes a plurality of second physical interfaces for transmitting the plurality of enabling information items from the plurality of enabling apparatuses to the safety apparatus.

By using a plurality of enabling devices and a plurality of second physical interfaces, the safety apparatus may, for example, be enabled based on a comprehensive overall view of safe operation of the device.

The plurality of enabling apparatuses may make available a plurality of enabling information items that may cover, for example, various individual aspects of the safe operation of the device. Exemplary individual aspects include converging multiple-program execution in the device, a stable clock supply of the device, a stable electrical power supply of the device, or opening of the device.

These individual aspects that may be covered in a respective enabling information item may be transmitted to the safety apparatus via a respective interface of the plurality of second physical interfaces and are joined there to form an overall view of the safe operation of the device. The overall view may be more comprehensive than the individual aspects that may be covered.

According to a further embodiment, the device is an embedded system, a field unit, a control unit, a stored-program controller, a server, a computer, or a smartphone.

This permits the device to be implemented for various applications.

The respective unit (e.g., computing unit or control unit) may be implemented by hardware technology and/or software technology. In the case of a hardware implementation, the respective unit may be embodied as a device or as part of a device (e.g., as a computer or as a microprocessor or as a control computer of a vehicle). In the case of software implementation, the respective unit may be embodied as a computer program product, as a function, as a routine, as a part of a program code, or as an object that may be executed.

The control apparatus of the device carries out, for example, monitoring and control operations or regulating operations of a technical process in that the control apparatus detects measurement variables using connected sensors and influences the technical process via connected actuators. The sensors and actuators may be connected to the device directly or via a bus or a data network. The device may also have a network connection via which, for example, planning data may be received or diagnostic data may be made available. For example, the control apparatus controls the device based on a cryptographically determined parameter. This may include, for example, the fact that the control apparatus uses the cryptographically determined parameter to check a cryptographic checksum of a received sensor measurement value (e.g., a cryptographic checksum of an actuator setpoint value that is to be made available) in order to set a cryptographically protected communication link to a further device (e.g., to a planning server or to a diagnostic server), in order to carry out authorization checking for the activation of a service access, in order to carry out authorization checking in order to execute a control algorithm, or in order to decrypt program code or data for carrying out a control operation, or in order to check the integrity thereof. However, a wide variety of further application possibilities may be provided (e.g., safe starting (booting) of the control apparatus or a safe firmware update).

In addition, a method for safely operating the device is proposed. The method includes making available enabling information for enabling the safety apparatus using the enabling apparatus. The enabling information is transmitted from the enabling apparatus to the safety apparatus via the second physical interface. The cryptographically determined parameter is made available by the safety apparatus. The cryptographically determined parameter is transmitted from the safety apparatus to the control apparatus via the first physical interface as a function of reception of the enabling information via the safety apparatus via the second physical interface. A control operation is carried out using a cryptographically determined parameter by the control apparatus.

A computer program product that causes the method as explained above to be carried out on a program-controlled device (e.g., a processor) is also provided.

A computer program product may be made available or supplied, for example, as a storage medium (e.g., a non-transitory computer-readable storage medium), such as, for example, a memory card, a USB stick, a CD-ROM, a DVD, or in the form of a file that may be downloaded from a server in a network. This may be done, for example, in a wireless communication network, by transmitting a corresponding file with the computer program product.

The embodiments and features that are described for the proposed device apply correspondingly to the proposed method.

Further possible implementations also include combinations, not explicitly mentioned, of features or embodiments that are described above or below in relation to the exemplary embodiments. In this context, a person skilled in the art will also add individual aspects as improvements or additions to the respective basic form of the invention.

BRIEF DESCRIPTION OF THE DRAWINGS

In the figures, same or functionally same elements have been provided with the same reference symbols unless stated otherwise.

DETAILED DESCRIPTION

Figure 1:
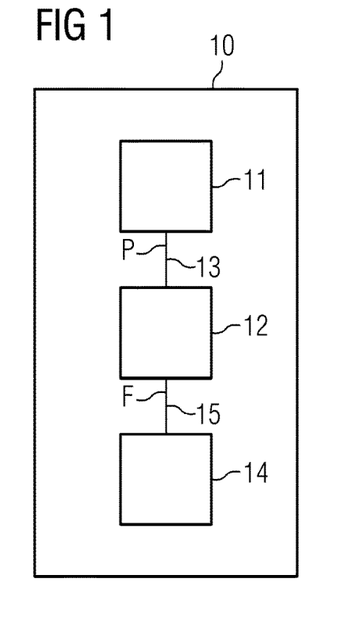
FIGS. 1-5 show schematic block circuit diagrams exemplary embodiments of a device.

FIG. 1 shows a schematic block circuit diagram of a first exemplary embodiment of a device 10.

The device 10 is, for example, an embedded system, a field unit, a control unit, a stored-program controller, a server, a computer or a smartphone.

The device 10 includes a control apparatus 11, a safety apparatus 12, a first physical interface 13, an enabling apparatus 14 and a second physical interface 15.

The enabling apparatus 14 makes available enabling information F for enabling the safety apparatus 12.

The second physical interface 15 transmits the enabling information F from the enabling apparatus 14 to the safety apparatus 12.

The safety apparatus 12 makes available a cryptographically determined parameter P and transmits the cryptographically determined parameter P to the control apparatus 11 via the first physical interface 13 as a function of reception of the enabling information F via the second physical interface 15.

The control apparatus 11 carries out a control operation using a cryptographically determined parameter P.

For example, the safety apparatus 12 may transmit the cryptographically determined parameter P to the control apparatus 11 via the first physical interface 13 as a function of reception and checking of the enabling information F via the second physical interface 15.

The safety apparatus 12 may be configured to transmit the cryptographically determined parameter P to the control apparatus 11 via the first physical interface 13 as a function of reception of the enabling information F via the second physical interface 15 and reception of further enabling information F via the first physical interface 13.

In addition, the enabling apparatus 14 may make available the enabling information F as a function of detection of a converging multiple program execution in the device 10, as a function of detection of a stable clock supply of the device 10, as a function of detection of a stable electrical power supply of the device 10, and/or as a function of detection of opening of the device 10.

Figure 2:
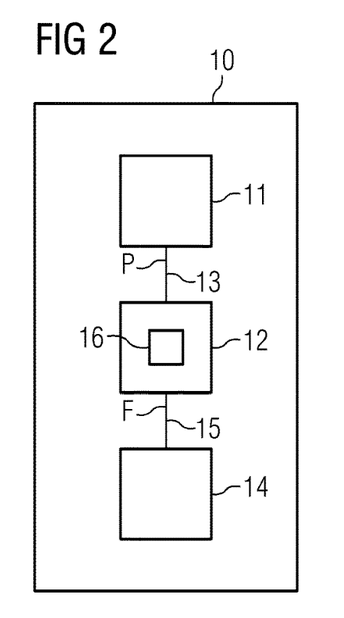

FIG. 2 shows a schematic block circuit diagram of a second exemplary embodiment of the device 10.

The device 10 includes the same features as the first exemplary embodiment illustrated above. However, the device 10 in this embodiment also has a parameter memory 16 for the cryptographically determined parameter P.

The parameter memory 16 may be written to only via a permanently assigned physical interface 13, 15 of the safety apparatus 12.

Alternatively, the parameter memory 16 may also store an identifier of a physical interface 13, 15, used for writing to the parameter memory 16, of the safety apparatus 12 in the cryptographically determined parameter P.

Figure 3:
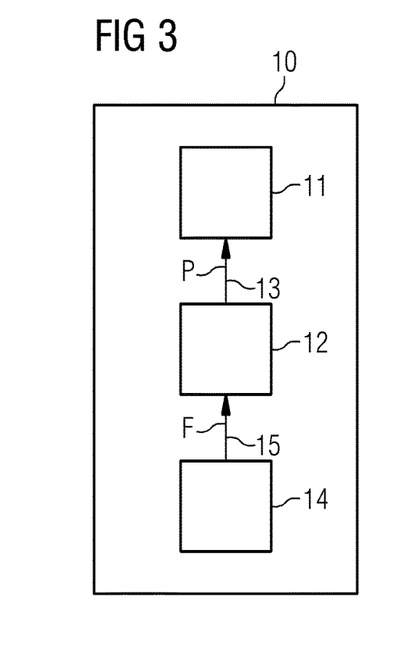

FIG. 3 shows a schematic block circuit diagram of a third exemplary embodiment of the device 10.

In contrast to the preceding exemplary embodiments of the device 10, the first physical interface 13 is embodied as a unidirectional interface coupled between the safety apparatus 12 and the control apparatus 11.

In addition, the second physical interface 15 is embodied as a unidirectional interface that is coupled between the enabling apparatus 14 and the control apparatus 11.

Figure 4:
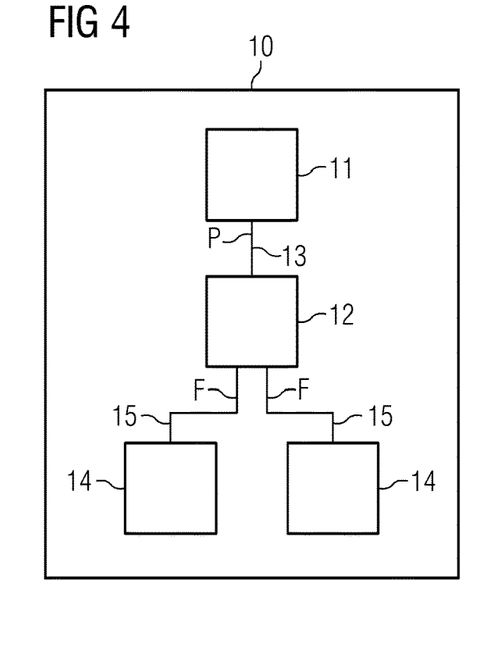

FIG. 4 shows a schematic block circuit diagram of a fourth exemplary embodiment of the device 10.

In addition to the preceding exemplary embodiments of the device 10, the device 10 includes a plurality of enabling apparatuses 14 and a plurality of second physical interfaces 15.

Accordingly, the plurality of enabling apparatuses 14 may make available a plurality of enabling information items F for enabling the safety apparatus 12, and the plurality of second physical interfaces 15 may transmit the plurality of enabling information items F from the plurality of enabling apparatuses 14 to the safety apparatus 12.

Figure 5:
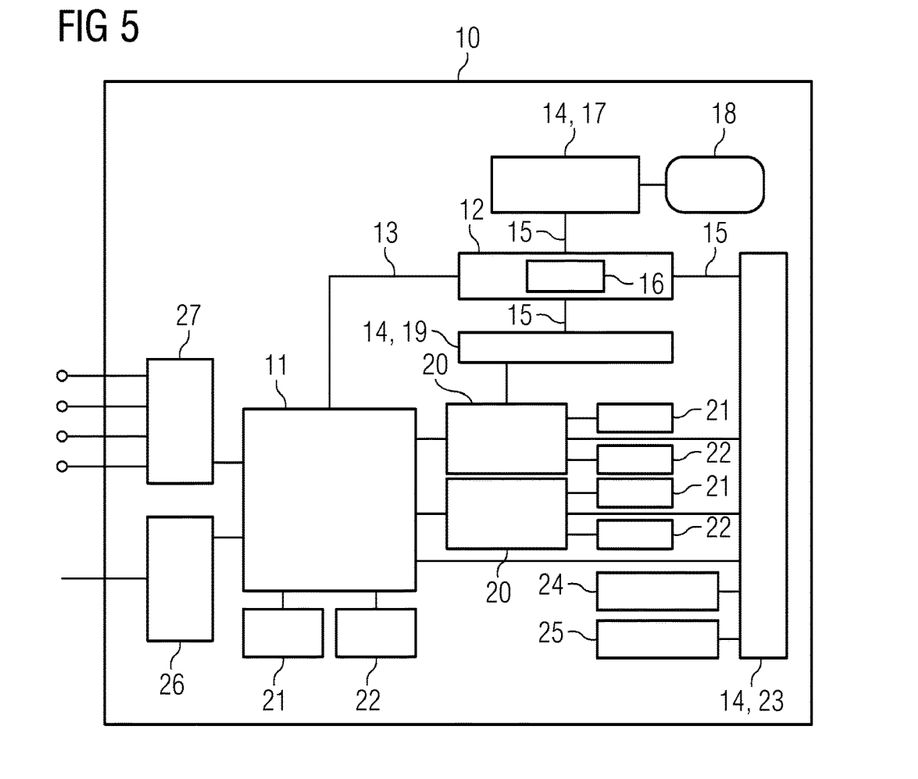

FIG. 5 shows a schematic block circuit diagram of a fifth exemplary embodiment of a device 10.

FIG. 5 shows a control apparatus 11 that is connected to a safety apparatus 12 via a first physical interface 13. The safety apparatus 12 includes a parameter memory 16 and is coupled via a plurality of second physical interfaces 15 to a plurality of enabling apparatuses 14 that are arranged in the periphery of the safety apparatus 12.

A tamper controller 17, which represents such an enabling apparatus 14, is shown at the upper edge of the schematically illustrated device 10. The tamper controller 17 monitors a passive and/or active anti-tamper protection (e.g., opening of a housing of the device 10). A tamper sensor 18 that is connected to the tamper controller 17 is provided as an example of this. The tamper controller 17 makes available enabling information F for the safety apparatus 12 as a function of this detection.

To the right next to the control apparatus 11 there are two further redundant control apparatuses 20 (e.g., security CPUs). The control apparatuses 11, 20 carry out nominally identical control programs separately from one another. For this purpose, the control apparatuses 11 are each assigned a separate volatile solid state memory 21 (e.g., RAM) and a separate non-volatile solid state memory 22 (e.g., flash). The multiple program execution serves, for example, to detect anomalies occurring in program sequences owing to tampering which program sequences are intended to produce the same result. However, calculation results of the redundant control apparatuses 20 may also serve as enabling information F for the safety apparatus 12. The dual-port RAM (DPRAM) 19 shown between the safety apparatus 12 and the redundant control apparatuses 20 in FIG. 5 serves as an enabling apparatus 14 that may make available this enabling information F to the safety apparatus 12 without reaction.

A safety watchdog 23 that is located at the right-hand edge of FIG. 5 is a further enabling apparatus 14. The safety watchdog 23 respectively monitors the multiple program execution explained above in the control apparatuses 11, 20 for convergence, and an electrical power supply 24 and a clock supply 25 for stability. The safety watchdog 23 makes available enabling information F for the safety apparatus 12 as a function of these detection results.

The device 10 also includes a network controller 26 and an input/output controller 27.

Figure 6:
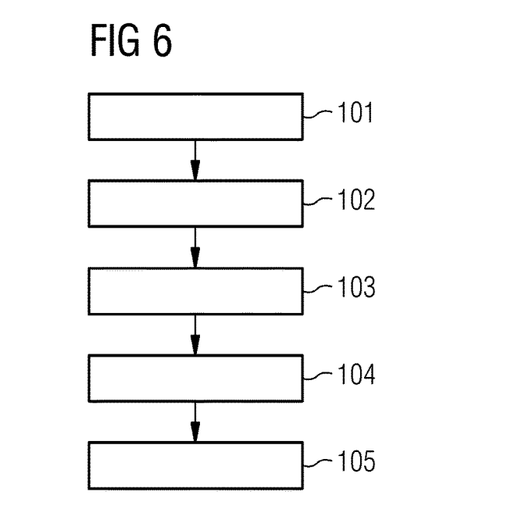
FIG. 6 shows an exemplary embodiment of a method for safely operating the device.

FIG. 6 shows an exemplary embodiment of a method for safely operating the device 10. Examples of the device 10 are illustrated in FIGS. 1 to 5. The method has the acts 101 to 105:

In act 101, enabling information F for enabling the safety apparatus 12 by the enabling apparatus 14 is made available.

In act 102, the enabling information F is transmitted from the enabling apparatus 14 to the safety apparatus 12 via the second physical interface 15.

In act 103, the cryptographically determined parameter P is made available by the safety apparatus 12.

In act 104, the cryptographically determined parameter P is transmitted by the safety apparatus 12 to the control apparatus 11 via the first physical interface 13 as a function of reception of the enabling information F by the safety apparatus 12 via the second physical interface 15.

In act 105, a control operation is carried out by the control apparatus 11 using a cryptographically determined parameter P.

Although the present invention has been described with reference to exemplary embodiments, the invention may be modified in a variety of ways.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device to prevent tampering of cryptographically determined parameters, the device comprising:
   a first controller configured to carry out a control operation using an enabled cryptographically determined parameter;
   a second controller for making available the enabled cryptographically determined parameter, the second controller physically separate from the first controller;
   a first physical interface configured to transmit the enabled cryptographically determined parameter from the second controller to the first controller;
   a third controller for making available enabling information for enabling the cryptographically determined parameter by the second controller, the third controller physically separate from the first controller and the second controller; and
   a second physical interface configured to transmit the enabling information from the third controller to the second controller, wherein the second controller is configured to enable the cryptographically determined parameter based on the enabling information and transmit the enabled cryptographically determined parameter to the first controller via the first physical interface as a function of reception of the enabling information via the second physical interface, wherein the second controller comprises a parameter memory for the cryptographically determined parameter.

2. The device of claim 1, wherein the second controller is configured to transmit the enabled cryptographically determined parameter to the first controller via the first physical interface as a function of reception and of checking of the enabling information via the second physical interface.

3. The device of claim 1, wherein the first physical interface is configured as a unidirectional interface coupled between the second controller and the first controller.

4. The device of claim 1, wherein the second controller is configured to transmit the enabled cryptographically determined parameter to the first controller via the first physical interface as a function of reception of the enabling information via the second physical interface and reception of further enabling information via the first physical interface.

5. The device of claim 1, wherein the parameter memory is operable to be written to only via a permanently assigned physical interface of the first physical interface, the second physical interface, or the first physical interface and the second physical interface of the second controller.

6. The device of claim 1, wherein the parameter memory is configured to store an identifier of a physical interface, used for writing to the parameter memory, of the first physical interface, the second physical interface, or the first physical interface and the second physical interface of the second controller in the cryptographically determined parameter.

7. The device of claim 1, wherein the third controller is configured to make available the enabling information as a function of detection of a converging multiple program execution in the device.

8. The device of claim 1, wherein the third controller is configured to make available the enabling information as a function of detection of a stable clock supply of the device.

9. The device of claim 1, wherein the third controller is configured to make available the enabling information as a function of detection of a stable electrical power supply of the device.

10. The device of claim 1, wherein the third controller is configured to make available the enabling information as a function of detection of an opening of the device.

11. The device of claim 1, wherein the second physical interface is configured as a unidirectional interface that is coupled between the third controller and the second controller.

12. The device of claim 1, further comprising:
a plurality of third controllers for making available a plurality of enabling information items for enabling the second controller; and
a plurality of second physical interfaces configured to transmit the plurality of enabling information items from the plurality of third controllers to the second controller.

13. The device of claim 1, wherein the device is an embedded system, a field unit, a control unit, a stored-program controller, a server, a computer or a smartphone.

14. The device of claim 1, wherein the second controller comprises a microcontroller.

15. A method for safely operating a device to prevent tampering of cryptographically determined parameters, the method comprising:
making available, using a first controller, enabling information for enabling a second controller, the first controller physically separate from the second controller;
transmitting the enabling information from the first controller to the second controller via a physical interface;
making available a cryptographically determined parameter using the second controller, wherein making available the cryptographically determined parameter comprises enabling the cryptographically determined parameter based on the enabling information;
transmitting the enabled cryptographically determined parameter from the second controller to a third controller via another physical interface as a function of reception of the enabling information via the second controller via the physical interface, the third controller physically separate from the first controller and the second controller; and
carrying out a control operation using the enabled cryptographically determined parameter using the third controller,
wherein the second controller comprises a parameter memory for the cryptographically determined parameter or the third controller is configured to make available the enabling information as a function of detection of a stable clock supply of the device.

16. The method of claim 15, further comprising transmitting, by the second controller, the enabled cryptographically determined parameter to the third controller via the other physical interface as a function of reception and of checking of the enabling information via the physical interface.

17. The method of claim 15, wherein the other physical interface is configured as a unidirectional interface coupled between the second controller and the third controller.

18. The method of claim 15, further comprising transmitting, by the second controller, the enabled cryptographically determined parameter to the third controller via the other physical interface as a function of reception of the enabling information via the physical interface and reception of further enabling information via the other physical interface.

19. A device to prevent tampering of cryptographically determined parameters, the device comprising:
a first controller configured to carry out a control operation using an enabled cryptographically determined parameter;
a second controller for making available the enabled cryptographically determined parameter, the second controller physically separate from the first controller;
a first physical interface configured to transmit the enabled cryptographically determined parameter from the second controller to the first controller;
a third controller for making available enabling information for enabling the cryptographically determined parameter by the second controller, the third controller physically separate from the first controller and the second controller; and
a second physical interface configured to transmit the enabling information from the third controller to the second controller,
wherein the second controller is configured to enable the cryptographically determined parameter based on the enabling information and transmit the enabled cryptographically determined parameter to the first controller via the first physical interface as a function of reception of the enabling information via the second physical interface, wherein the third controller is configured to make available the enabling information as a function of detection of a stable clock supply of the device.

* * * * *